United States Patent

Webb

[15] 3,654,450

[45] Apr. 4, 1972

[54] DIGITAL SIGNAL GENERATOR SYNTHESIZER

[72] Inventor: Joseph A. Webb, 503 Fairdale, Friendswood, Tex. 77546

[22] Filed: Apr. 3, 1970

[21] Appl. No.: 25,348

[52] U.S. Cl. ..........................235/197, 235/150.53, 235/152, 328/14

[51] Int. Cl. ..........................G06f 15/34

[58] Field of Search ...............235/197, 150.53, 152; 328/14, 328/142, 187, 165; 331/38, 39; 324/77; 340/347; 178/5.4

[56] References Cited

UNITED STATES PATENTS

| | | | |
|---|---|---|---|
| 3,544,906 | 12/1970 | Dulaney et al. | 328/165 |
| 3,529,138 | 9/1970 | Andre et al. | 235/197 |
| 3,464,018 | 8/1969 | Cliff | 328/187 X |
| 3,331,035 | 7/1967 | Strickholm | 328/14 X |
| 3,454,883 | 7/1969 | Oropeza et al | 328/14 |
| 3,500,213 | 3/1970 | Ameau | 328/14 |

*Primary Examiner*—Joseph F. Ruggiero
*Attorney*—Carlos A. Torres

[57] ABSTRACT

Illustrative embodiments of the present invention shown and described include digital logic systems for generating signal waveforms of desired types. A relatively few digital logic modules are connected to generate a variety of desired waveshapes in a linear manner. Apparatus for generating rectangular waves, saw-tooth waves, sine waves, and sine waves having amplitude, pulse, frequency and phase modulation applied to them are disclosed.

20 Claims, 8 Drawing Figures

RECTANGULAR WAVE AND SAW-TOOTH WAVE GENERATOR

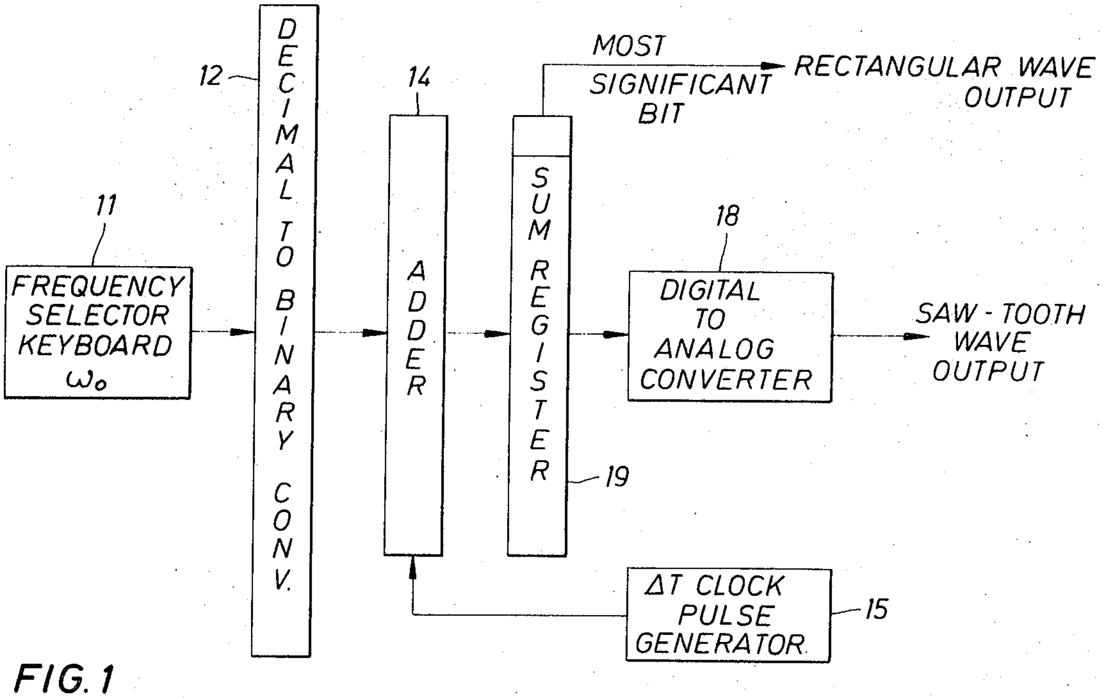
FIG. 1
RECTANGULAR WAVE AND SAW-TOOTH WAVE GENERATOR
FIG. 2
| TIME IN 1/16 SEC. | SUM REGISTER CONTENTS | MOST SIGNIFICANT BIT OUTPUT FROM SUM REGISTER | SAW TOOTH OUTPUT FROM D/A CONVERTER |
|---|---|---|---|
| 1 | 0001 | -1 | -7/8 |
| 2 | 0010 | -1 | -6/8 |
| 3 | 0010 | -1 | -5/8 |
| 4 | 0100 | -1 | -4/8 |
| 5 | 0101 | -1 | -3/8 |
| 6 | 0110 | -1 | -2/8 |
| 7 | 0111 | -1 | -1/8 |
| 8 | 1000 | +1 | 0 |
| 9 | 1001 | +1 | +1/8 |
| 10 | 1010 | +1 | +2/8 |
| 11 | 1011 | +1 | +3/8 |
| 12 | 1100 | +1 | +4/8 |
| 13 | 1101 | +1 | +5/8 |
| 14 | 1110 | +1 | +6/8 |
| 15 | 1111 | +1 | +7/8 |
| 16 | 0000 | -1 | -1 |
FIG. 3
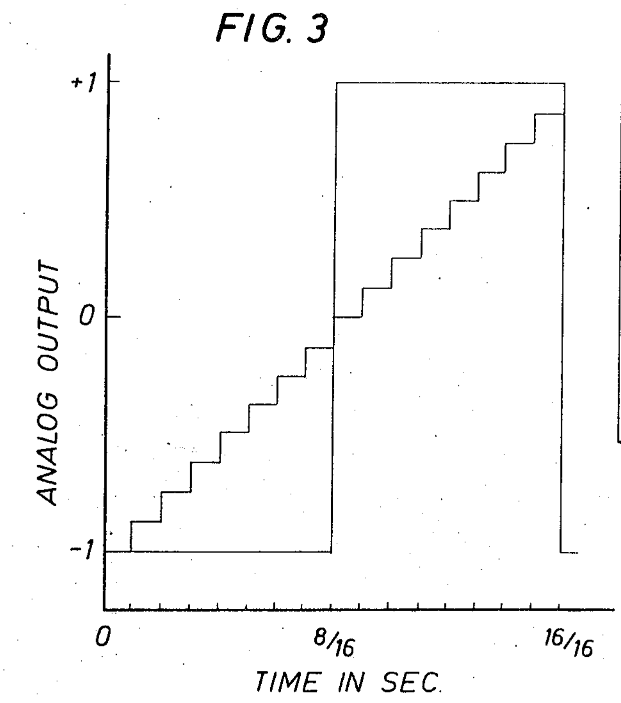
Joseph A. Webb
INVENTOR
BY Carlos A. Torres
ATTORNEY

CONTINUOUS WAVE SINE WAVE GENERATOR

FREQUENCY OR PHASE MODULATED SIGNAL GENERATOR

Joseph A. Webb
INVENTOR

BY

Carlos A. Torres
ATTORNEY

AMPLITUDE MODULATED SIGNAL GENERATOR

PULSE MODULATED SIGNAL GENERATOR

Joseph A. Webb
INVENTOR

BY Carlos A. Torres
ATTORNEY

DIGITAL SIGNAL GENERATOR SYNTHESIZER

BACKGROUND OF THE INVENTION

This invention relates to signal generators and more particularly to digital signal generating systems for synthesizing analog signals.

In the past, mathematical models of analog circuits have frequently been used to analyze the operational characteristics of those circuits in a system. Mathematical concepts, such as the transfer function of an analog device have been employed to this end. Such mathematical models have to a large extent been set up to describe how it is believed that the analog circuit in question operates rather than than how it should operate. By the use of digital circuits, mathematical logic can be incorporated directly into a signal synthesizer to generate a waveform which exactly comprises the mathematical expression describing the behavior which it is desired for such a waveform to exhibit.

In the past, analog devices have chiefly been utilized in the are of frequency synthesis or signal synthesis. This has been due largely to the fact that the operating frequencies desired have fallen in the range where the implementation of digital frequency synthesis would have been impractical due to the speed requirements placed on digital circuit modules capable of performing the frequency or signal synthesis. Presently, however, digital logic modules in ECL (Emitter Coupled Logic) or TTL (Transistor Transistor Logic) are available which are capable of performing logical operations at rates of $10^7$ to $10^9$ per second. Using the concepts of the present invention and incorporating available hardware, it is possible to construct a signal synthesizer which is capable of reproducing virtually any waveform which may be mathematically described at frequencies up to at least 50 Megahertz.

Prior art frequency synthesizers have chiefly relied on the principle of phase locking a voltage controlled oscillator to the fundamental, or some harmonic frequency, of a precisely calibrated timing source, such as a crystal controlled oscillator. While such devices have been very accurate in their response, the analog approach to signal synthesis, as opposed to frequency synthesis, has been more cumbersome than desired. In particular, it should be noted that an analog signal synthesizer requires completely separate analog circuitry for each signal waveform that it is desired to produce with the device. That is to say, if it is desired to produce a rectangular waveform with an analog signal synthesizer, this requires a particular analog circuit adapted to this end, whereas if it is desired to produce a complex modulated waveform, this requires yet another analog circuit, such as a modulator for amplitude modulation, or separate frequency or phase modulators if this type of modulation is desired to be placed upon the signal. A digital frequency synthesizer or signal waveshape synthesizer in accordance with the concepts of the present invention, on the other hand, is capable of utilizing a relatively small number of digital logic modules to produce virtually any waveshape which can be described mathematically. For these reasons, a digital signal synthesizer in accordance with the concepts of the present invention is more economical than an analog signal synthesizer which requires a multiplicity of circuitry to produce individually describable waveshapes.

Digitally synthesized signals have the further capability of being modulated in any predetermined manner, or through any desired encoding scheme with virtually foolproof accuracy. Such signals can be directly modulated by a digital computer, for example, in a precisely pre-programmed manner which is not a function of circuit parameters or variations. This is due to the fact that a digital logic module is, in effect, a linear operator which performs a specific function in a repetitive manner regardless of external conditions. This is to be contrasted with an analog circuit whose operation will remain linear in nature over only a small portion of its operating range, and which is highly dependent on external factors such as temperature, circuit voltage variations and circuit transient response. Thus a digital synthesizer in accordance with the principles of the present invention is much more reliable than a corresponding analog signal synthesizer.

Accordingly, it is an object of the present invention to provide methods and apparatus for digitally synthesizing signal waveshapes at frequencies in the high frequency or radio frequency region.

It is a further object of the present invention to provide methods and apparatus for digitally virtually any signal waveshape which may be described mathematically.

Yet another object of the present invention is to provide methods and apparatus for signal synthesis capable, through the use of a relatively small number of digital logic modules, of simulating any desired waveshape from DC to the upper limits of the high frequency portion of the radio spectrum.

A still further object of the present invention is to provide by the use of digital techniques a signal synthesizer which is more versatile and economical than has heretofore been possible with the use of analog circuitry.

In accordance with the objects of the present invention, apparatus and methods are provided for synthesizing desired waveshapes at frequencies from DC to the upper limits of the high frequency radio spectrum through the use of digital logic modules. Basic digital logic modules are provided for frequency selection, addition, register operations and other digital arithmetic functions. Digital memory modules are utilized to advantages in performing arithmetic functions and modulation generations including external analog or digital devices may be incorporated into a system in accordance with the invention. Specific embodiments for performing continuous sine wave synthesis, amplitude modulation synthesis, frequency or phase modulation synthesis, rectangular and saw-tooth wave synthesis and pulse modulation synthesis are illustrated. A relatively few digital logic devices are incorporated in each of these embodiments and a versatile instrument may be designed around these logic modules with appropriate switching means provided to interconnect the modules in the desired fashion for a specific type of waveform synthesis.

The foregoing and other objects, features and advantages of the present invention will become apparent from the detailed description to follow when taken in conjunction with the accompanying drawings in which:

BRIEF DESCRIPTION OF THE DRAWINGS

FIG. 1 is a block diagram illustrating simplified rectangular and saw-tooth wave generator apparatus utilizing principles of the present invention;

FIG. 2 is a timing scale for the rectangular and saw-tooth wave generator of FIG. 1;

FIG. 3 is a graphical illustration of the rectangular and saw-tooth wave output of the apparatus of FIG. 1 in an exemplary case;

DESCRIPTION OF THE PREFERRED EMBODIMENTS

Figure 4:
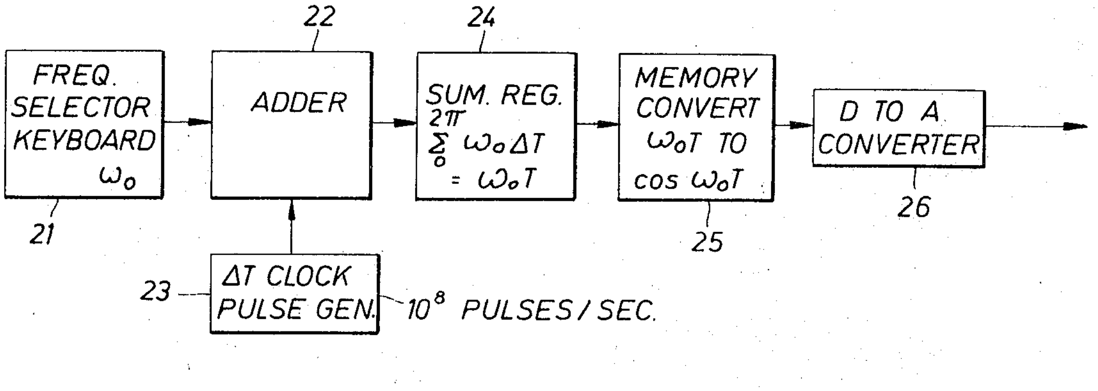
FIG. 4 is a block diagram illustrating a continuous wave sine wave generator utilizing principles of the present invention.

In order to better understand the principles of the present invention, a simplified rectangular and saw-tooth wave generator in accordance with these principles will be described. This description is followed by other embodiments of the present invention which disclose methods and means for generating continuous sine wave signals, phase modulated signals, frequency modulated signals, amplitude modulated signals and pulse modulated signals. A relatively few types of digital logic modules are utilized in the different embodiments shown and described to achieve a variety of different waveform syntheses. The digital logic modules which are utilized are interconnected in such a manner as to generate the desired waveform or type of modulation by the utilization of the mathematical expression which describes the particular desired waveform or modulation. Thus, virtually any waveshape which may be described mathematically may be generated in accordance with the concepts of the present invention.

Referring not to FIG. 1, a simplified apparatus for generating rectangular and saw-tooth waveforms according to the digital principles of the present invention is shown schematically. This apparatus includes a frequency selector keyboard 11 which is used to select the frequency to be synthesized. It will be appreciated by those skilled in the art, however, that this frequency selector keyboard can be any number of digits in length depending upon the desired frequency range of the apparatus. In fact, if desired, the keyboard apparatus need not be used since the frequency selection means can be any type of digital service. Thus, by way of example, a digital computer can be employed as the frequency selector means. The keyboard apparatus of FIG. 1 includes a decimal-to-binary converter 12 which is connected to keyboard 11 and may actually comprise a part of the keyboard apparatus. A digital adder circuit 14, driven by a clock pulse generator 15, repetitively adds the contents of the decimal-to-binary converter 12 to the contents of a sum register 19. The most significant bit of sum register 19 provides a rectangular wave output. Finally, a digital-to-analog converter 18 is included to accept the outputs of the sum register 19 and thereby to produce a saw-tooth waveform output signal proportional to such register outputs.

For purposes of illustration, the operation apparatus of FIG. 1 will be described with regard to the synthesis of a 1 cycle per second rectangular and saw-tooth wave output. For this purpose, clock pulse generator 15 will be assumed to generate 16 pulse per second. It will be understood that in practice, the frequency of the clock pulse generator 15 must be at least as high as 2 pulses per cycle of the maximum synthesized frequency, as required by the Nyquist frequency criterion given by the following equation:

$$f_{osc} \geq 2f_{syn} \qquad (1)$$

where $f_{osc}$ is the frequency of the oscillator or clock pulse generator 15 and $f_{syn}$ is the maximum frequency which can be synthesized. If the oscillator operates at any lower frequency, correct frequency synthesis is not possible.

The operation of the apparatus of FIG. 1 for generating one complete cycle of a one cycle per second rectangular wave may be described as follows: First, the desired frequency to be generated is entered on the keyboard 11 by the operator. Decimal-to-binary converter 12 converts this number to binary form. The length of decimal-to-binary converter 12 is, of course, determined by the size of keyboard 11. This length may be determined from Equation 2 as follows:

$$2^n = N \quad (2)$$

where n is the number of bits necessary in decimal-to-binary converter 12 to have the least significant bit represent the least count of the device, and $N$ is the total binary count or resolution of the generator. For example, if it is desired to synthesize frequencies up to 50 Megahertz, with resolution to 1 Hz., we would have from Equation 2:

$$2^n = 5 \times 10^7 \text{ or}$$
$$n \log_{10}{}^2 = {}^7 \log_{10}5 \text{ or}$$
$$n \approx 26 \text{ bits}$$

The contents of decimal-to-binary converter 12 are repetitively added to the contents of the sum register 19 by adder 14, which may be a conventional binary adder as known in the art, at a rate determined by clock pulse generator 15. Thus, at any instant in time, the sum register contains the quantity $\Sigma\ \omega\ \Delta\ t = \omega\ t$. Assuming frequency select keyboard 11 is set to 1 Hz. and clock 15 produces 16 pulses per second, after 16 successive pulses, sum register 19 "spills over," or returns to 0,since the one cycle per second being simulated here has completed one cycle. Initially, and at the end of each cycle of the frequency being synthesized, the contents of binary sum register 19 are zero. After one sixteenth of a second (or one clock pulse from the clock pulse generator 15) the contents of sum register 19 are 1 as indicated in the first line of the timing chart of FIG. 2. After three-sixteenths of a second the contents of four bit sum register 19 are a binary three (i.e., 0011) etc. The contents of sum register 19 for one complete second of operation are illustrated in the second column of FIG. 2.

To generate a rectangular wave, it is merely necessary to examine the most significant bit of sum register 19 and determine if the number in this register represents the first half of a cycle (in which case it is assumed that a negative output will be generated) or if the number in the sum register 19 represents the second half of the cycle (in which case it is assumed that a positive output will be generated). This logic may be obtained by simply providing an output from the most significant bit of sum register 19, which is a binary 0 during the first half cycle, and a binary 1 during the second half cycle, as shown in the second column of FIG. 2. The contents of sum register 19 may be thought of as a phase angle varying between 0 and 2 $\pi$ radians. During the first half cycle (0 to $\pi$), sum register 19 contains a binary 0,and the rectangular wave output from FIG. 1 is negative. During the second half cycle ($\pi$ to 2 $\pi$) a binary 1 is indicated and the rectangular wave output from FIG. 1 is positive.

The contents of sum register 19 are supplied to digital-to-analog converter 18 for output as a saw-tooth wave, or may be output in digital form for use, for example, by a digital computer, if this is desired. For most practical purposes, it will be desired to convert the contents of sum register 19 to analog form for output usage. Thus, the digital-to-analog converter produces the saw-tooth waveform illustrated in FIG. 3 based on the contents of sum register 19. A saw-tooth wave output is produced as a linearly increasing voltage to a maximum value when sum register 19 reads maximum, followed by an instantaneous drop to zero when sum register 19 returns to zero. Other functions which may be described mathematically may be generated in this manner and embodiments which illustrate how this may be accomplished for several cases are described below. As long as clock pulse generator 15 operates at a frequency high enough to satisfy the Nyquist frequency criterion, digital synthesis of signals may be accomplished in this manner. The digital logic modules described above are connected in a sequential manner with each module producing an output word at the end of its operation and transmitting this word to the next module at each clock period. Thus, the upper limit of the speed of operation of the system is only limited by the speed of the slowest digital logic module in the system. Using ECL (Emitter Coupled Logic) circuits presently available, rectangular and saw-tooth waves at frequencies in excess of 50 MHz. may be generated in this manner.

Referring now to FIG. 4, apparatus for generating a continuous sine wave is illustrated schematically. It may be shown mathematically that a continuous sine wave may be represented by:

$$Y(t)_{cw} = A_0 \cos\omega_o t \qquad (3)$$

where $A_o$ is the amplitude of the wave $\omega_o$ is the angular frequency ($2\pi f_o$) of the wave, and $t$ is time. The apparatus illustrated in block form in FIG. 4 is capable of generating such a waveform at frequencies in excess of 50 Mhz. For this purpose, frequency selector keyboard 21 may be used to provide selection of the frequency to be synthesized as previously discussed. It will be understood that this keyboard apparatus also contains a decimal-to-binary converter corresponding to that shown in FIG. 1. The contents of the output of keyboard 21 converted to binary form are supplied to an adder 22 which is driven by a clock pulse generator 23. Referring to the Nyquist criterion of Equation 1,it is seen that it is necessary for the clock pulse generator to run at a minimum rate of $10^8$ pulse per second in order to be able to synthesize frequencies up to 50 MHz. Thus, the contents of keyboard 21 are added to the contents of sum register 24 by adder 22 each 10 nanoseconds as governed by the rate of clock pulse generator 23. The high order bits (8 bits for example) of the resulting sum register 24 contents are interpreted as an 8 bit number representing an angle between 0 and $2\pi$. This number is representative of the quantity $\Sigma\omega_o \cdot \Delta t = \omega_0 t$, at any instant during the operation of the apparatus. The 8 bit number appearing in the high order bit positions of sum register 24 is supplied to a special purpose circuit 25 which computes the value, "cos $\omega_o t$, " by a table lookup method. The circuit could comprise, for example, a read-only memory containing 256 entries corresponding to the 256 possible configurations of the contents of the 8 high order bit positions of sum register 24 and containing in these read-only memory locations the 256 incremental values of the cosine of angles divided into 256 increments between 0 and $2\pi$. The output of cosine $\omega_o t$ circuit 25, is input to a digital-to-analog converter 26 which produces the analog output signal illustrated in FIG. 5 for a one cycle per second input on frequency selector keyboard 21.

Figure 5:
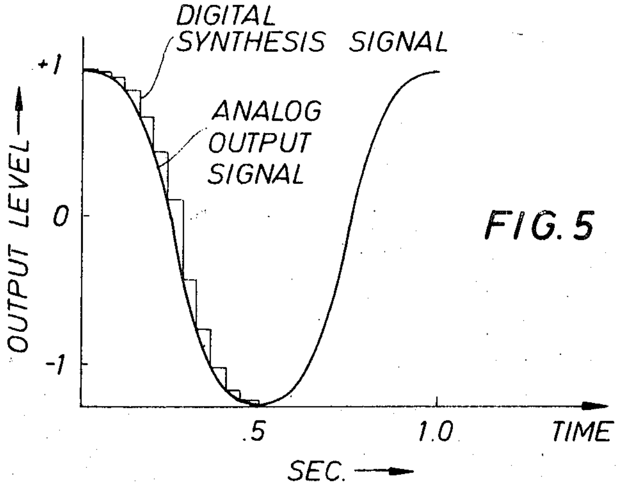
FIG. 5 is a graphical illustration of the output of the apparatus of FIG. 4 in an exemplary case.

The stairstep function illustrated in FIG. 5 represents schematically the digital approximation to the values of cos $\omega_o t$ for a one cycle per second frequency. If, for example, it is chosen to synthesize a one cycle per second sine wave utilizing the apparatus of FIG. 4, the operation may be described as follows: first a "1" is entered into the frequency selector keyboard 21 by the operator. This decimal number is converted to binary form and appears in the low order bit positions of keyboard 21 as previously discussed. For 1/156 of a second the contents of the 8 high order bit positions of sum register 24 will remain zero and during this period the cosine of zero (=1) will be generated by memory conversion circuit 25. After the number appearing in low order bit positions of keyboard 21 has been added the appropriate number of times (for 1/256 of a second), a binary 1 will appear in the eighth or least significant output of sum register 24. This number represents an angle of 1/256 of $2\pi$ radians. Memory conversion circuit 25 then produces the value of the cosine of this angle which is applied to digital-to-analog converter 26 and converted to analog form for output. So the operation continues until the complete analog output function has been generated in the space of one second as illustrated in FIG. 5.

It should be noted that it is possible to generate rectangular waves also with the apparatus of FIG. 4. This is accomplished by providing an output from the most significant bit position of sum register 24. In this case, rather than producing the value of the cosine of the angle between 0 and $2\pi$ for the number in the sum register the most significant bit position merely produces a $+1$ or a $-1$ output depending upon whether the bit indicates a binary 1 or 0, indicating that sum register 24 is in the angular range between 0 and $\pi$ or the range between $\pi$ and $2\pi$ similar to the manner previously discussed with respect to the apparatus of FIG. 1. Thus, using the most significant bit of sum register 24, it is possible to generate the one cycle per second rectangular wave illustrated in FIG. 3 with the apparatus of FIG. 4.

Figure 6:
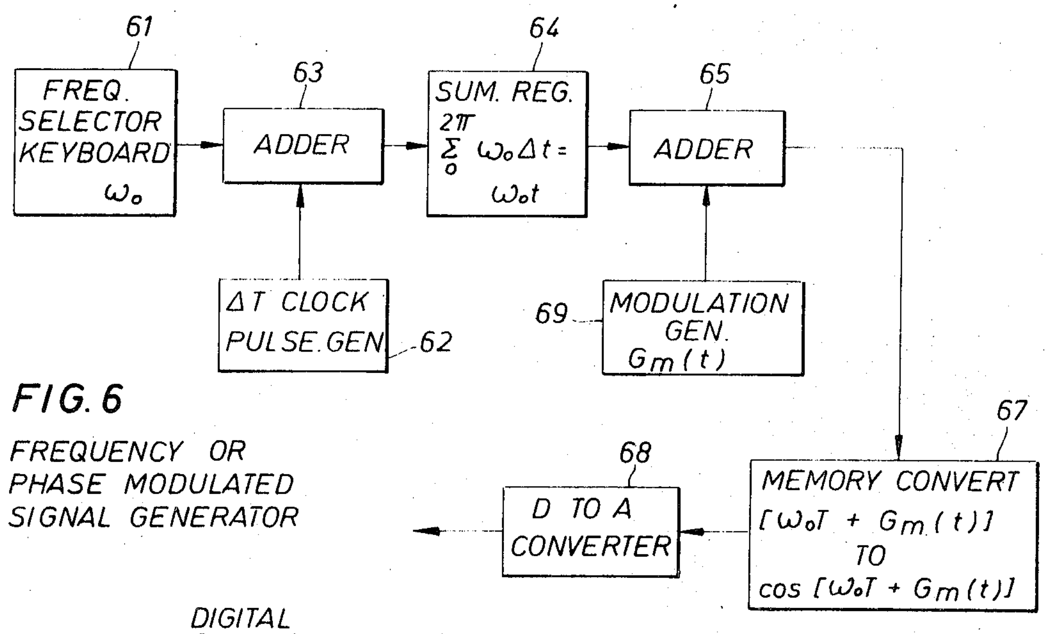
FIG. 6 is a block diagram illustrating apparatus in accordance with the present invention for generating frequency or phase modulated signals.

Referring now to FIG. 6, apparatus for generating phase or frequency modulated signals is illustrated in block diagram form. It may be shown mathematically that a phase or frequency modulated signal $Y_{(t)\substack{PM\\FM}}$ can be expressed as $$Y_{(t)\substack{PM\\FM}} = A_o \cos\left[\omega_o t + G_m(t)\right] \qquad (4)$$

where $A_o$ is the amplitude of the wave, $\omega_o$ is the angular frequency of the wave and the function $G_m(t)$ is the modulating function applied to the wave. This function may take on any desired form as for example voice modulation. The similarity of this expression to that of Equation 3 for a continuous sine wave should be noted. In this case, the modulation function $G_m(t)$ is merely added to the angular frequency function $\omega_o t$. In the apparatus of FIG. 6, again the frequency desired is selected by the operator on keyboard 61 and is converted to binary in the manner previously discussed. Clock pulse generator 62 similarly provides timing pulses to adder 63 at a minimum rate prescribed by the Nyquist frequency criterion of Equation 1. The contents of frequency selector 61 are added by adder 63 to the contents of sum register 64 in a manner similar to that previously discussed. Here, instead of immediately applying the high order bit position contents of the sum register to the cosine conversion circuit as in the previous case of the continuous wave generator, the contents of the sum register are supplied to a second adder 65 which adds in the effects contributed by modulation generator 69. This modulation generator may comprises, for example, in the case of voice modulation, an analog-to-digital converter which converts the audio waveforms input to it to digital numbers which are supplied to adder 65. It should be noted that the timing requirements on the modulation generator are much less than that of other circuitry in the system since it must only be responsive to the relatively lower frequency of the modulation which is being input to it. Alternatively, modulation generator 69 could comprise a digital computer or other source of digital data which may be used to generate any desired phase or frequency modulated waveform in this manner.

The 8 high order bit positions comprising the output of adder 65 are interpreted as an angle between 0 and $2\pi$ radians as previously discussed with respect to sum register 24 of FIG. 4. These output 8 bits are converted to a cosine function by circuit 67 which may comprise a read-only memory type, table lookup as previously discussed. The output of cosine conversion circuit 67 is then applied to a digital-to-analog converter 68 where it is converted to analog form for output.

By a slight rearrangement of components, the apparatus of FIG. 6 may be utilized to generate frequency modulated waveforms rather than phase modulated waveforms if desired. For example, by replacing sum register 64 with a holding register and by supplying the output of modulation generator 69 to first adder 63 instead of second adder 65, frequency modulation may be achieved. In this case the mathematical expression describing the operation remains the same as that given in Equation 4 but the effect of a modulation, constant with respect to time, is slightly different. Using the arrangement shown in FIG. 6, a time constant modulation generated by modulation generator 69 produces a constant phase offset, but no frequency shift at the output. Using the slightly rearranged apparatus just described, the resultant of a time constant modulation would be a constant frequency shift.

Figure 7:
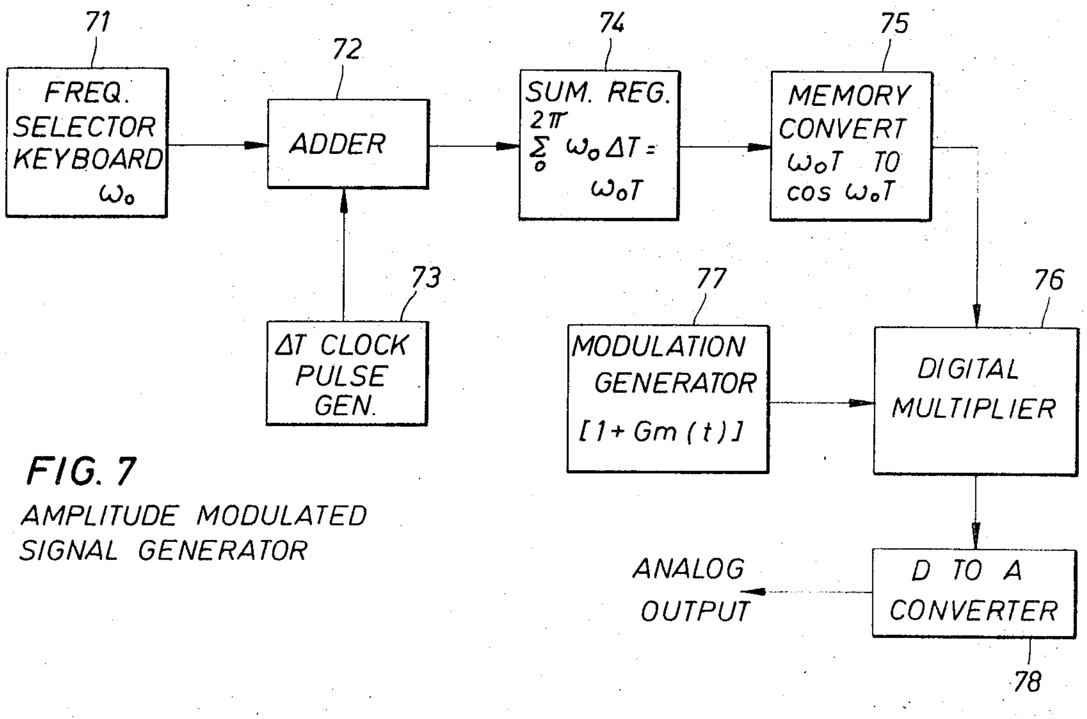
FIG. 7 is a block diagram illustrating apparatus in accordance with the present invention for generating amplitude modulated signals.

Referring now to FIG. 7, apparatus for producing an amplitude modulated signal is illustrated schematically. It may be shown mathematically that an amplitude modulated signal may be represented as $$Y_{(t)AM} = A_o \cos \omega_o t\left[1 + G_m(t)\right] \qquad (5)$$

where $A_o$ is the amplitude of the wave, $\omega_o$ is the angular frequency of the wave and $G_m(t)$ is the modulating function Thus, it is apparent from the expression of Equation 5 when taken in conjunction with the previously disclosed apparatus that it is possible to generate such an amplitude modulated signal in a similar manner to that previously discussed. In FIG. 7, the frequency at which the signal is to be generated is selected on frequency select keyboard 71 which may be identical to those previously discussed. Again, the frequency selector keyboard contains a decimal-to-binary converter as previously described. The contents of the frequency select keyboard are repetitively added to the contents of sum register 74 by adder 72 which is driven by clock pulse generator 73. The resultant appears in sum register 74. Sum register 74 is again of the type in which the high order bit positions may be interpreted as containing, for example, an 8 binary digit number representing an angle between 0 and $2\pi$ radians. The output of the sum register 74 is applied to cosine conversion circuit 75 which converts it angular contents to the cosine of the angle memory conversion table lookup as previously discussed. Here, however, the cosine of the angle is supplied to digital multiplier circuit 76. Multiplier 76 may be a conventional digital multiplier or could comprise, for example, a pipe line multiplier which performs multiplication by a series of adding and shifting operations. Certain D to A converters provide for "external reference" voltage modulation, which would allow direct analog amplitude modulation of the D to A converter. Modulation generator 77 generates an 8 bit binary number which is proportional to the quantity $[1 + G_m(t)]$ where $G_m(t)$ is an arbitrary modulation function supplied as a function of time. Digital multiplier 76 multiplies this function by cos $\omega_o t$,thus, supplying an output number which is proportional to the expression of Equation 5. A signal representative of the amplitude modulated signal desired is output from digital multiplier 76 to a digital-to-analog converter 78 which supplies an analog output signal for use as may be desired.

Here, the modulation generator produces a slightly different form of output function by adding 1 to the modulation impressed upon it as represented by the modulation function $G_m(t$. The modulation generator may be an analog-to-digital converter device for digitizing audio waveshapes if it is desired to modulate the signal with voice modulation, or it may be a digital computer which produces digital output encoded in some form.

The speed of systems such as have been described in limited only by the speed of the slowest component circuit module used in the system. With recent advances in integrated circuit memories, read-only memory modules are presently available with access times in the 10 nanosecond region. Further, digital adders are presently available capable of performing 100 million operations per second and higher through the use of ECL design. Accordingly, it is presently possible to generate signals with the types of modulation previously discussed at frequencies up to at least 50 MHz. with currently available integrated circuit modules.

It may be generally stated that by utilizing principles such as shown in the previously discussed digital synthesizing systems of the present invention, it is possible to synthesize or generate signals of virtually any type which may be described mathematically at frequencies up to at least 50 MHz. with existing integrated circuit modules. Moreover, it is anticipated that as the speed of integrated circuit modules is increased, it will be possible to exceed even these rates.

Figure 8:
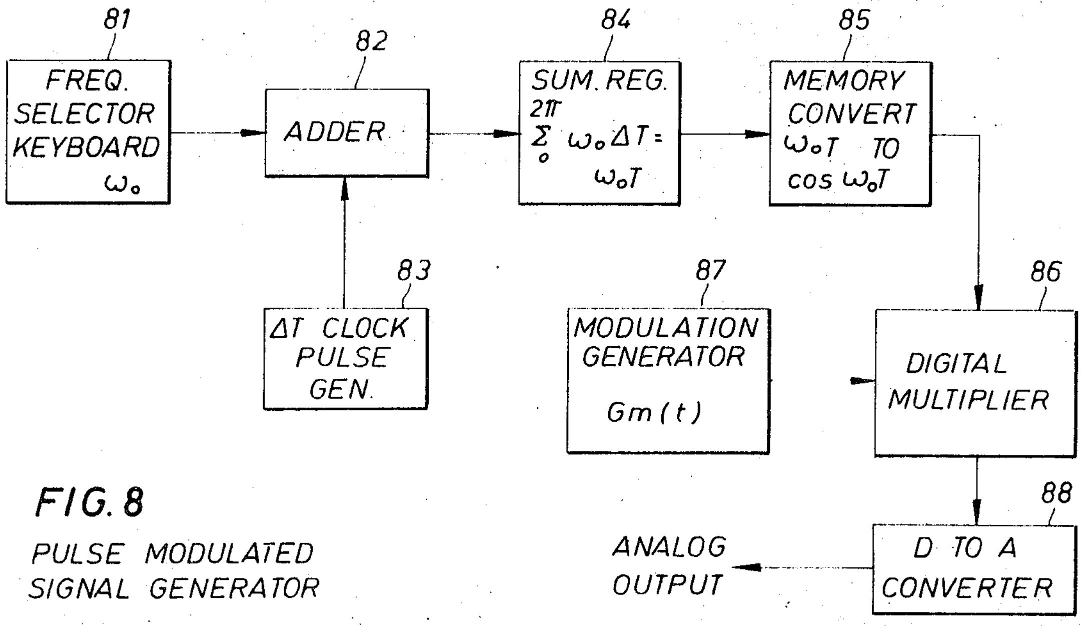
FIG. 8 is a block diagram illustrating apparatus in accordance with the present invention for generating pulse signals.

With this in mind, a final embodiment of the present invention which is useful in the generation of shaped pulses such as could be used in radar will now be discussed. Referring finally to FIG. 8, apparatus for generating pulse modulated signals is illustrated in block diagram form. It may be shown mathematically that a pulse modulated signal may be represented by $$Y_{(t)\ pulse} = A_o \cos \omega_o t\ [G_m(t)] \qquad (6)$$

where $A_o$ is the amplitude of the signal, $\omega_o$ is the angular frequency of the signal and $G_m(t)$ is again the modulating function applied to the signal. In the case of an RF pulse generation, $G_m(t)$ may be chosen to be a Gaussian function of the form $$G_m(t) = e^{-kt^2} \qquad (7)$$

The apparatus of FIG. 8 includes a frequency selector keyboard 81 of the type previously discussed which contains a decimal-to-binary converter of sufficient length to encompass the desired frequency range. The output of frequency selector keyboard 81 is supplied to an adder 82 which again is driven by clock pulse generator 83 in the manner previously described. Sum register 84 again contains a number which may be interpreted as an angle between 0 and $2\pi$ radians which is converted to the cosine function of that angle by a conversion circuit 85 of the read-only memory type previously discussed. The output of the cosine conversion circuit is input to a digital multiplier 86 which multiplies this quantity together with the modulation function waveform generated by modulation generator 87. In the case of RF pulse generation this modulation generator might generate a Gaussian function of the type described by Equation 7. This could also be performed by means of a read-only memory type table lookup circuit if desired. This function is multiplied by the cosine function output of conversion circuit 85 by digital multiplier 86. The digital number representing this expression is then input to a digital-to-analog converter 88 and converted to analog output for desired use. One particular application of interest for a pulse generator of this type is the generation of radar pulses. While most radar generally operates at frequencies above the maximum which present logic circuit hardware can generate, it will be appreciated by those skilled in the art that the analog output of digital-to-analog converter 88 can be frequency multiplied or heterodyned with VHF or UHF signals generated by conventional analog circuitry to obtain any desired frequency for use in such a radar system. Similarly, modulated signal waveforms of the other embodiments shown and described can be generated at UHF or VHF frequencies in this manner.

Methods and apparatus have been described in the foregoing for generating a plurality of different types of signal functions. It will be appreciated that almost all analog signals have a mathematical counterpart representation, and utilizing the principles of the present invention, it is possible to generate virtually any desired waveshape which may be described mathematically.

Accordingly, while preferred embodiments of the present invention have been shown and described, it will be appreciated by those skilled in the art that modifications and changes may be made without departing from this invention in its broader aspects.

What is claimed is:

1. Apparatus for generating synthesized signal waveforms of frequency $f_{syn}$ and having predetermined waveshape or frequency distribution characteristics comprising:

a. digital means for selecting a desired signal frequency $f_{syn}$;

b. timing means operating at a frequency $f_{osc}$ for supplying timing signals;

c. digital circuit means responsive to said timing means for repetitively deriving characteristics of the synthesized signal according to a predetermined mathematical relationship; and d. means responsive to said digital circuit means for providing discrete output representations of the synthesized signal with said synthesized signal waveform $Y(t)$ comprising a modulated wave and said predetermined mathematical relationship given by $$Y(t) = A_o \cos [\omega_o t + 0\ G_m(t)]$$

where $\omega_o = 2\pi f_{syn}$ (modulo $2\pi$),$A_o$in an arbitrary constant amplitude and $G_m(t)$ is an arbitrary modulation supplied as a function of time.

2. A method for generating synthesized signal waveform of frequency $f_{syn}$ and having predetermined waveshape or frequency distribution comprising the steps of:

a. selecting a desired signal frequency $f_{syn}$; syn;

b. generating timing signals at a frequency $f_{osc}$ where $f_{osc}$ is generated at a f frequency of at least two $f_{syn}$;

c. repetitively deriving in response to said timing signals digital amplitude or frequency characteristics of the synthesized signal at the occurrence of a timing signal according to a predetermined mathematical relationship; and d. generating discrete output signals being representative of the amplitude or frequency characteristics of the synthesized signals are derived by said predetermined mathematical relationship.

3. Apparatus for generating synthesized signal waveforms of frequency $f_{syn}$ and having predetermined waveshape or frequency distribution characteristics comprising:

a. digital means for selecting a desired signal frequency $f_{syn}$;

b. timing means operating at a frequency $f_{osc}$ for supplying timing signals;

c. digital circuit means responsive to said timing means for repetitively deriving characteristics of the synthesized signal according to a predetermined mathematical relationship; and d. means responsive to said digital circuit means for providing discrete output representations of the synthesized signal with said synthesized signal waveform $Y(t)$ comprising an amplitude modulated wave and said predetermined mathematical relationship being an amplitude relationship given by $$Y(t) = A \cos \omega_o t \; [1 + G_m(t)]$$

where $\omega_o = 2\pi f_{syn}$ (modulo $2\pi$), $A_o$ is an arbitrary constant amplitude and $G_m(t)$ is an arbitrary modulation supplied as a function of time.

4. Apparatus for generating synthesized signal waveforms of frequency $f_{syn}$ and having predetermined waveshape or frequency distribution characteristics comprising:

a. digital means for selecting a desired signal frequency $f_{syn}$;
b. timing means operating at a frequency $f_{osc}$ for supplying timing signals;
c. digital circuit means responsive to said timing means for repetitively deriving characteristics of the synthesized signal according to a predetermined mathematical relationship; and
d. means responsive to said digital circuit means for providing output representations of the synthesized signal with said synthesized signal waveform $Y(t)$ comprising a pulse modulated wave and said predetermined mathematical relationship being an amplitude relationship given by $$Y(t) = A_o \cos \omega_o t \; [G_m(t)]$$

where $\omega_o = 2\pi f_{syn}$ (modulo $2\pi$), $A_o$ is an arbitrary constant amplitude and $G_m(t)$ is an arbitrary modulation supplied as a function of time.

5. The apparatus of claim 4, wherein the modulation function $G_m(t)$ is given by $$G_m(t) = e^{-kt^2}$$

where $e$ is the Naperian Logarithm base, and $k$ is a predetermined constant.

6. Apparatus for generating synthesized signal waveforms of frequency $f_{syn}$ and having predetermined waveshape or frequency distribution characteristics comprising:

a. digital means for selecting a desired signal frequency $f_{syn}$;
b. timing means operating at a frequency $f_{osc}$ for supplying timing signals;
c. digital circuit means responsive to said timing means for repetitively deriving characteristics to the synthesized signal according to a predetermined mathematical relationship; and
d. means responsive to said digital circuit means for providing discrete output representations of the synthesized signal with said digital circuit means including digital register means having frequency selector means for holding a digital number representative of the desired operating frequency $f_{syn}$, and summing register means for accepting the output of a digital adder driven by said timing means and connected to add the contents of said summing register to a portion of the contents of said frequency selector, thereby producing in said summing register an output representative of $\omega_o t$ where $\omega_o = 2\pi f_{syn}$ (modulo $2\pi$).

7. The apparatus of claim 6 wherein said digital circuit means responsive to said timing means further includes digital circuit means for interpreting the contents of said summing register as an angle between 0 and $2\pi$ radians and for deriving the cosine of this angle and generating a digital output representative thereof.

8. The apparatus of claim 7 and further including converter means for converting the digital output of said cosine circuit means to an analog waveform.

9. The apparatus of claim 6 and further including second digital adder means, said second adder means being connected to add the contents of said summing register and the output of a digital modulation generator thereby producing an output representative of $[G_m(t) + \omega_o t]$ where $G_m(t)$ is an arbitrary modulation function supplied in digital form by said modulation generator and $\omega_o = 2\pi f_{syn}$ (modulo $2\pi$).

10. The apparatus of claim 10 and further including digital circuit means for interpreting the contents of said adder means as an angle between 0 and $2\pi$ radians and for deriving the cosine of said angle and generating a digital output representative thereof.

11. The apparatus of claim 10 and further including converter means for converting the digital output of said cosine circuit means to an analog waveform.

12. The apparatus of claim 7 and further including digital multiplier circuit means for multiplying the output of said cosine circuit by the output of a digital modulation generator, thereby producing an output representative of the quantity $\cos \omega_o t[G_m(t)]$ where $\omega_o = 2\pi f_{syn}$ (modulo $2\pi$) and $[1 + G_m(t)]$ is an arbitrary modulation function supplied in digital form by said modulation generator.

13. The apparatus of claim 7 and further including digital multiplier circuit means for multiplying the output of said cosine circuit by the output of a digital modulation generator, thereby producing an output representative of the quantity $\cos \omega_o t \; [G_m(t)]$ where $\omega_o = f_{syn}$ (modulo $2\pi$) and $G_m(t)$ is an arbitrary modulation function supplied in digital form by said modulation generator.

14. Apparatus for generating synthesized signal waveforms of frequency $f_{syn}$ and having predetermined waveshape or frequency distribution characteristics comprising:

a. digital means fir selecting a desired signal frequency $f_{syn}$;
b. timing means operating at a frequency $f_{osc}$ for supplying timing signals;
c. digital circuit means responsive to said timing means for repetitively deriving characteristics of the synthesized signal according to a predetermined mathematical relationship; and
d. means responsive to said digital circuit means for providing output representations of the synthesized signals with said synthesized signal waveforms $Y(t)$ comprising a sawtooth wave, where the output signal amplitude is derived from the most significant bits of a sum register.

15. Apparatus for generating synthesized signal waveforms of frequency $f_{syn}$ and having predetermined waveshape or frequency distribution characteristics comprising:

a. digital means for selecting a desired signal frequency $f_{syn}$;
b. timing means operating at a frequency $f_{osc}$ for supplying timing signals;
c. digital circuit means responsive to said timing means for repetitively deriving characteristics of the synthesized signal according to a predetermined mathematical relationship; and
d. generating discrete output signals being representative of the amplitude or frequency characteristics of the synthesized signals as derived by said predetermined mathematical relationship with said synthesized signal Y(t) being derived in accordance with the relationship $$Y(t) = A_o \cos [\omega_o t + G_m(t)]$$

where $\omega_o = 2\pi f_{syn}$ (modulo $2\pi$), $A_o$ is an arbitrary constant amplitude and $G_m(t)$ is an arbitrary modulation function.

18. A method for generating synthesized signal waveform frequency $f_{syn}$ and having a predetermined waveshape or frequency distribution comprising the steps of:

a. selecting a desired signal frequency $f_{syn}$;
b. generating time signals at a frequency $f_{osc}$;
c. repetitively deriving in response to said timing signals digital amplitude or frequency characteristics of the synthesized signal at the occurrence of a timing signal according to a predetermined mathematical relationship; and
d. generating discrete output signals being representative of the amplitude or frequency characteristics of the synthesized signals as derived by said predetermined mathematical relationship wherein said synthesized signal $Y(t)$ is derived in accordance with the relationship $$Y(t) = A_o \cos {**}_o t \; [1 + G_m(t)]$$

where $\omega_o = 2\pi f_{syn}$ (modulo $2\pi$), $A_o$ is an arbitrary modulation function.

19. A method of generating synthesized signal waveforms of frequency $f_{syn}$ and having a predetermined waveshape or frequency distribution comprising the steps of:

a. selecting a desired frequency $f_{syn}$;

b. generating time signals at a frequency $f_{osc}$;

c. repetitively deriving in response to said timing signals digital amplitude or frequency characteristics of the synthesized signal at the occurrence of a timing signal according to a predetermined mathematical relationship; and d. generating discrete output signal being representative of the amplitude or frequency characteristics of the synthesized signal as derived by said predetermined mathematical relationship wherein the synthesized signal $y(t)$ is derived in accordance with the relationship $$Y(t) = A_o \cos \omega_o t \, [G_m(t)]$$

where $\omega_o = 2\pi f_{syn}$ (modulo $2\pi$), $A_o$ is an arbitrary constant amplitude and $G_m(t)$ is an arbitrary modulation function.

20. The method of claim 19 wherein the modulation function $G_m(t)$ is of the form $$G_m(t) = e^{-kt^2}$$

where $e$ is the Naperian Logarithm base and $k$ is a predetermined constant.

* * * * *